United States Patent
Morioka et al.

[11] Patent Number: 5,995,111
[45] Date of Patent: Nov. 30, 1999

[54] IMAGE PROCESSING APPARATUS AND METHOD

[75] Inventors: Seisuke Morioka; Masaru Takano, both of Tokyo, Japan

[73] Assignee: Sega Enterprises, Ltd., Tokyo, Japan

[21] Appl. No.: 08/980,911

[22] Filed: Dec. 1, 1997

[30] Foreign Application Priority Data

Dec. 6, 1996 [JP] Japan ................................ 8-326641
Oct. 29, 1997 [JP] Japan ................................ 9-296812

[51] Int. Cl.[6] ........................................ G09G 3/00
[52] U.S. Cl. ................................................ 345/429
[58] Field of Search .............................. 345/418, 419, 345/425, 427, 428, 429, 430

[56] References Cited

U.S. PATENT DOCUMENTS

| | | | |
|---|---|---|---|
| 5,606,650 | 2/1997 | Kelley et al. ........................ | 345/428 |
| 5,612,715 | 3/1997 | Karaki et al. ........................ | 345/428 |
| 5,754,183 | 5/1998 | Berend et al. ........................ | 345/429 |
| 5,777,621 | 7/1998 | Schneider et al. .................... | 345/429 |
| 5,818,456 | 10/1998 | Cosman et al. ....................... | 345/429 |
| 5,828,379 | 10/1998 | Cok ................................... | 345/429 |
| 5,847,712 | 12/1998 | Salesin et al. ...................... | 345/429 |

*Primary Examiner*—Phu K. Nguyen
*Assistant Examiner*—Cliff N. Vo
*Attorney, Agent, or Firm*—Dickstein Shapiro Morin & Oshinsky LLP

[57] ABSTRACT

An image processing apparatus for generating image data to be displayed on a predetermined display screen, comprises an image data generator for receiving polygon information of a polygon including at least position information on the display screen and generating image data corresponding to pixels in the polygon; a frame buffer memory for storing image data pixel by pixel; a blur-value buffer memory for storing information of a degree of influence of the image data of each pixel on pixels therearound, as a blur value, in a predetermined pixel unit; and a blur processor for performing an arithmetic operation on the image data of each pixel, read from the frame buffer memory, in accordance with the degree of influence from surrounding pixels, read from the blur-value buffer memory, to generate image data to be displayed on the display screen, and by a method for this apparatus.

18 Claims, 11 Drawing Sheets

FIG. 9

DEGREE OF BLURRING INFLUENCE FORM SURROUNDING PIXELS OR PIXEL P4 (WEIGHTING FILTER)

| B08, | B17, | B26 |
|---|---|---|
| B35, | 1, | B53 |
| B62, | B71, | B80 |

$$PP4 = (B08*CP0 + B17*CP1 + B26*CP2 + B35*CP3 + CP4 + B53*CP5 + B62*CP6 + B71*CP7 + B80*CP8) / Q$$

WEIGHTING AVERAGING CIRCUIT

PRINCIPLE OF OPERATION OF Z-VALUE COMPARATOR

IMAGE PROCESSING APPARATUS AND METHOD

BACKGROUND OF THE INVENTION

1. FIELD OF THE INVENTION

The present invention relates to computer graphics processing, and, more particularly, to an image processing apparatus and method capable of carrying out a blur process for giving a blur effect to an afterimage or the like of an object which is out of focus or moving fast.

2. DESCRIPTION OF THE RELATED ART

A computer graphics processing technique is used in a simulation apparatus, a game machine and the like. Normally, a simulation or game is implemented by a computer program, each object of an image is moved or the position of an observing point, the angle of visibility or the like is altered in accordance with the manipulation by an operator, and the image is then displayed on a display unit such as a monitor TV.

In this case, for example, position coordinates on the display screen are acquired by perspective transformation from three-dimensional coordinates to two-dimensional coordinates based on the position information of each object which is acquired by performing an arithmetic operation according to a computer program, and image data including pixel-by-pixel color information is obtained by a rendering process (filling process) based on information of the position coordinates and texture data, such as the display colors and patterns of individual objects, and is written in a frame buffer memory. The pixel-by-pixel color data written in the frame buffer memory is displayed on a monitor TV or the like after being subjected to D/A conversion.

As discussed above, main image processing includes a transformation process for the positions of a plurality of polygons which constitute an object and a rendering process for performing color filling on the polygon through both of which pixel-by-pixel image data is acquired and stored in the frame buffer memory. Each of those processes itself requires a lot of computations.

An image to be output after computer-aided image processing is normally a clear image with its all objects in focus without blurring, and may be more realistic if it is blurred depending on the type, movement, position, etc. of each object. To provide depth perception, for example, making an object near the focus clear and blurring an object out of focus in accordance with the depth of field are more preferable to making a closer object larger and a distant object smaller by simple perspective transformation. Further, it is preferable that an object which is moving fast should have some blur to the afterimage of the rear portion of the object, which is called motion blur. It is more realistic that a light source which has an extremely high luminance or an object on which light from such a light source is irradiated has blur around itself. Further, blur on an image opposite to semitransparent glass can present better expression of semitransparency. In some cases, it may be effective to always put blur on a specific object or polygon from the viewpoint of the progression of a game.

As apparent from the above, performing a blur process on a polygon makes an image to be displayed more realistic or more effective.

Conventionally, for example, the blur process spatially overlaps plural pieces of image data one on another, slightly shifting them. Alternatively, plural pieces of image data, shifted from one another over time, are overlapped one on another. Preparing plural pieces of image data however needs a very long image processing time, which results in an insufficient processing time to the preparation of the image data while reproducing ordinary motion on the display screen.

SUMMARY OF THE INVENTION

Accordingly, it is an object of the present invention to provide an image processing apparatus and method capable of performing a blur process by merely adding a minimum process while using conventional ordinary image processing.

According to one aspect of this invention, this object is achieved by an image processing apparatus for generating image data to be displayed on a predetermined display screen, which apparatus comprises an image data generator for receiving polygon information of a polygon including at least position information on the display screen and generating image data corresponding to pixels in the polygon; a frame buffer memory for storing the image data pixel by pixel; a blur-value buffer memory for storing information of a degree of influence of the image data of each pixel on pixels therearound, as a blur value, in a predetermined pixel unit; and a blur processor for performing an arithmetic operation on the image data of each pixel, read from the frame buffer memory, in accordance with the degree of influence from surrounding pixels, read from the blur-value buffer memory, to generate image data to be displayed on the display screen, and by a method for this apparatus.

Further, the position information included in the polygon information includes a Z value for indicating of a depth of a polygon on the display screen, and the image data generator generates Z values for pixels in a polygon to be displayed on the display screen, pixel by pixel; the image processing apparatus further comprises a Z-value buffer memory for storing the pixel-by-pixel Z values; and the degree of influence of each pixel on pixels therearound is determined in accordance with a difference between the Z value of the each pixel and a depth of field to be displayed on the display screen.

Alternatively, the image data generator generates a velocity vector of each pixel, and the degree of influence of the each pixel on pixels therearound is determined in accordance with the velocity vector of that pixel.

Alternatively, the polygon information includes luminance information or information for determining a luminance, and the image data generator generates luminance information of each pixel; and when the luminance information of each pixel exceeds a predetermined value, the degree of influence of that pixel on pixels therearound is determined in accordance with the luminance information.

Alternatively, the polygon information includes transparency information of a polygon or information for determining a transparency of that polygon, and the image data generator generates image data of a semitransparent polygon overlapped with a polygon located at the back of the semitransparent polygon; and the degree of influence of pixels in the back polygon on surrounding pixels is determined in accordance with the transparency information.

As described above, data indicating the degree of influence of each predetermined pixel unit on surrounding pixels is written in the provided blur-value buffer memory. Then, image data to be displayed is computed from image data, which is read from the frame buffer memory, and the degree of influence which is the blur value of the read image data. Therefore, single drawing of an image in the frame buffer memory suffices, so that the blur process can be carried out efficiently. Note that data should be recorded in the blur-value buffer memory in a predetermined pixel unit or the units of $N^2$ (N: integer) pixels.

Further, according to this invention, the blur processor in the above-described image processing apparatus is provided between the frame buffer memory and the output terminal to the display unit, and the image data, generated by the blur processor, is supplied directly to the display unit. It is therefore possible to supply image data to the display unit while executing the blur process independent of the process of writing image data in the frame buffer memory.

According to another aspect of this invention, there is provided an image processing apparatus for generating image data to be displayed on a predetermined display screen, which apparatus comprises an image data generator for receiving polygon information of a polygon including at least position information on the display screen and generating image data corresponding to pixels in the polygon; a frame buffer memory for storing image data corresponding to the pixels; an effect-value buffer memory for storing effect values indicating execution of a predetermined effect process on image data of individual pixels, pixel by pixel; and an effect processor for performing the effect process on the image data of each pixel, read from the frame buffer memory, in accordance with an effect value read from the effect-value buffer memory, to generate image data to be displayed on the display screen, and supplying the image data to a display unit.

This invention is not limited to an image processing apparatus and method which involve a blur process, but in the case of carrying out an ordinary effect process such as a fluctuation process for a distant view under a desert or savanna environment or the like, image data subjected to a predetermined effect process by the effect processor is generated in the stage of outputting image data in the frame buffer memory to the display unit, and is supplied directly to the display unit.

BRIEF DESCRIPTION OF THE DRAWINGS

FIG. 9 is a diagram depicting a weighting filter;

DETAILED DESCRIPTION OF THE PREFERRED EMBODIMENT

A preferred embodiment of the present invention will now be described with reference to the accompanying drawings.

It is to be noted however that the technical scope of this invention is in no way restricted by this embodiment.

Blur Process

Figure 1:
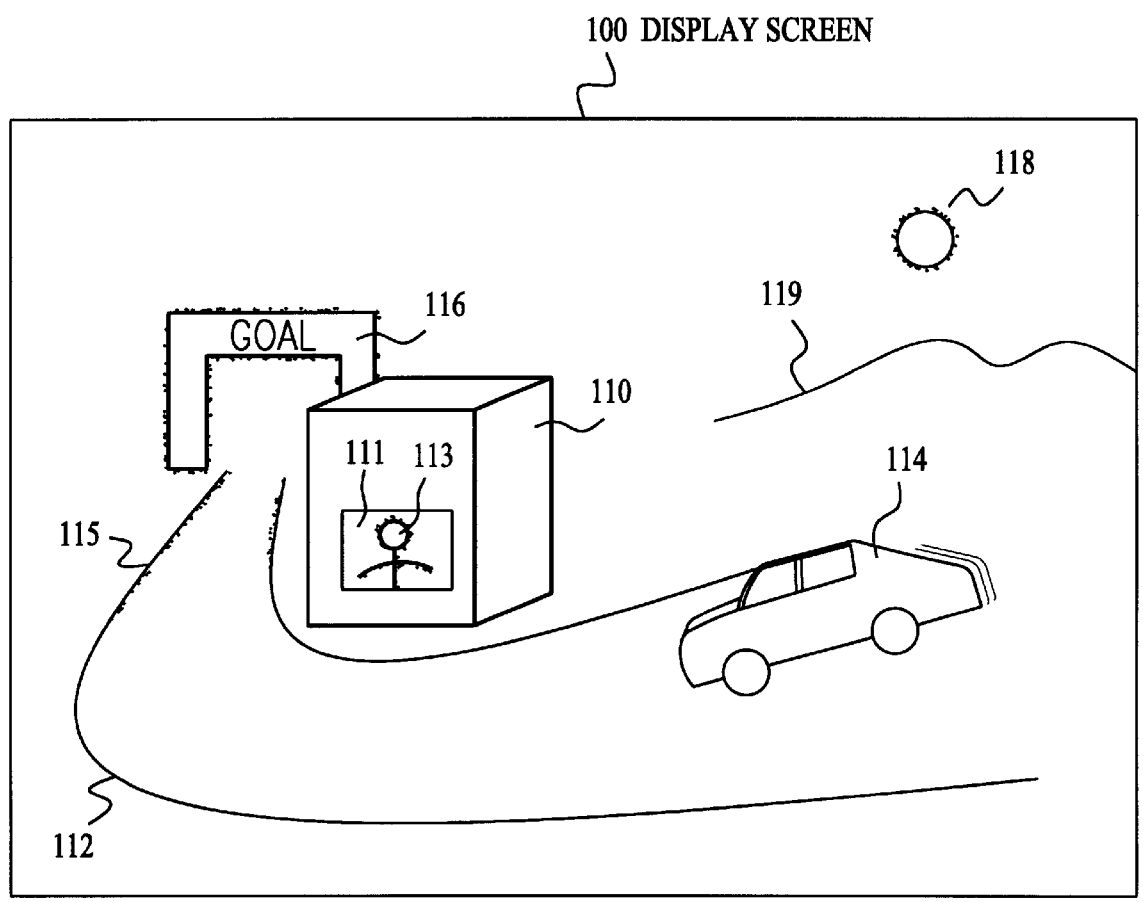
FIG. 1 is a diagram exemplifying an image for explaining a blur process.

FIG. 1 is a diagram exemplifying an image for explaining a blur process. In this example, a display screen 100 contains, as objects, a building 110, a road 112, a running car 114, a gate 116 indicative of a goal provided in the distance of the road 112, a mountain 119 and the sun 118, the last two at more distant places. A semitransparent glass surface 111 is provided on the front wall of the building 110, with a person 113 seen through the glass surface 111.

In such an example, it is desirable to put blur to the following portions in order to display a more realistic image.

(1) To express depth perception between the building 110 on which a camera is focused and the goal 116 positioned far away from the focal point, the building 110 is shown clear and the goal 116 is subjected to a blur process.

(2) Blurring is given to the rear portion of the car 114 which is moving fast should to express an afterimage in the so-called motion blur.

(3) It is effective to perform a blur process on the sun 118 itself which has a very high luminance or an object (not shown) which is irradiated with the sun light and has a high luminance.

(4) One may think applying a blur process also to the person 113 opposite to the semitransparent glass surface 111.

(5) Blurring may intentionally be given to a distant portion 115 of the road 112 to effectively express that distance.

While the blur process varies in multifarious ways in accordance with what effect a designer intends to give to the final image to be displayed, the above five modes are the main blur processes generally required and should be fulfilled.

Outline of Image Processing Apparatus

Figure 2:
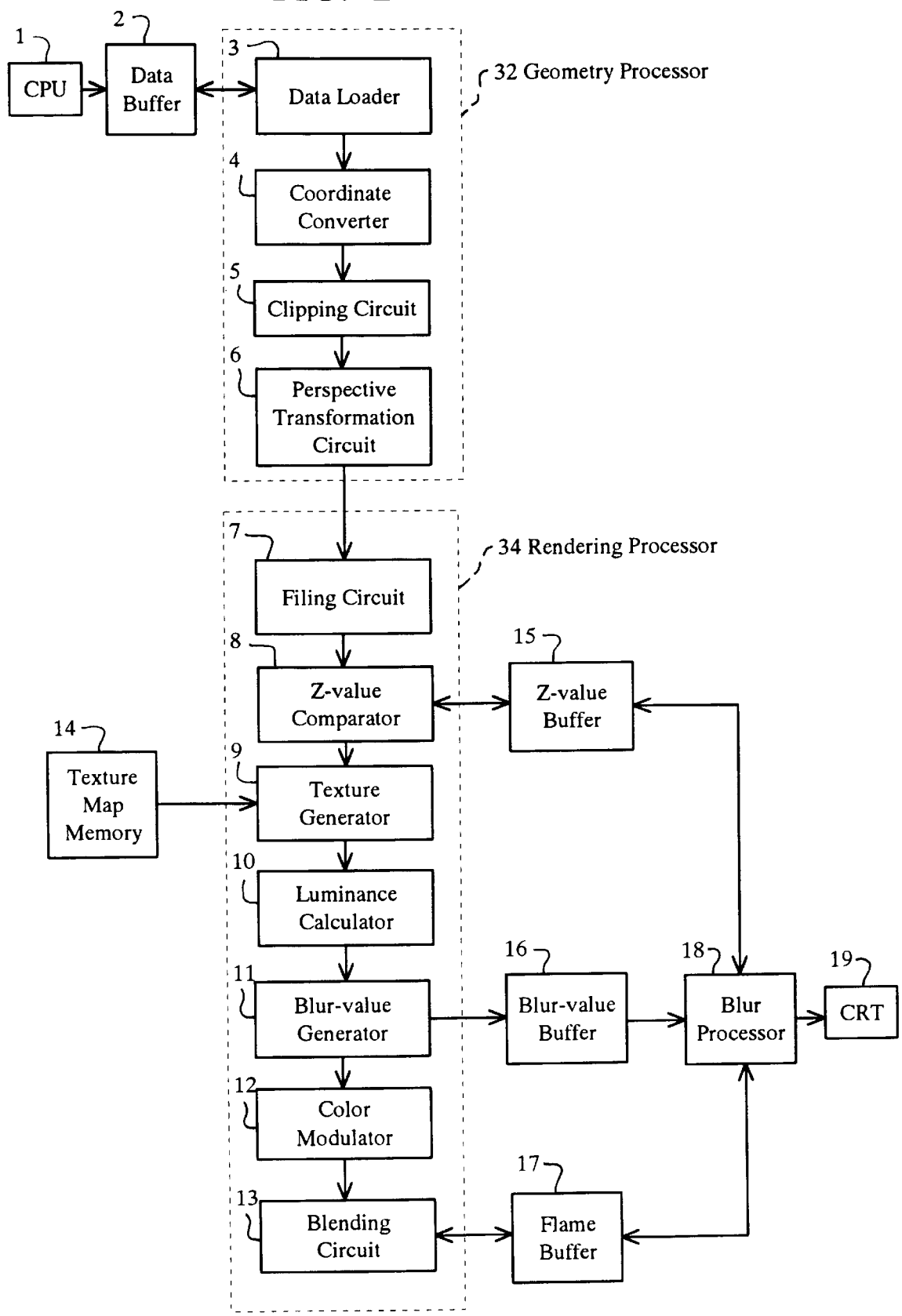
FIG. 2 is a block diagram of an image processing apparatus which carries out the blur process.

FIG. 2 is a block diagram of an image processing apparatus which can execute the aforementioned blur processes. The structure of the image processing apparatus will now be discussed briefly. A CPU 1, which runs a computer program for a simulation or a game, is a control apparatus for generating polygon data constituting objects, observing point information on the display screen and the like that are essential in image processing. The CPU 1 is connected via an unillustrated bus to a RAM, which is used in arithmetic operations, a ROM where the aforementioned computer program, object data, etc. are stored, and an input/output section. The CPU 1 writes the polygon data, etc. in a data buffer 2, and then causes a geometry processor 32 or a rendering processor 34, at subsequent stages, to perform image processing.

The geometry processor 32 performs an arithmetic operation on polygon data for layout conversion of a polygon in the three-dimensional coordinate space to carry out perspective transformation of the polygon data to the two-dimensional coordinates on the display screen.

The rendering processor 34 mainly computes various attribute data by interpolation or the like from vertex data, with respect to pixels in an area defined by the vertex coordinates of a polygon which are given from the geometry processor 32, reads data in the associated address area from a texture map memory 14, calculate image data, and stores the pixel-by-pixel image data in a frame buffer memory 17. Although the display screen is two-dimensional coordinate space, the Z values of the foremost pixels on the display screen are stored in a Z-value buffer memory 15 at the same time for overlapping between pixels.

Reference numeral "16" is a blur-value buffer memory 16 where data necessary for any blur process of this invention is stored pixel by pixel or in the units of a predetermined number of pixels (hereinafter referred to as "predetermined pixel unit"). The preparation of data to be stored in the blur-value buffer memory 16 is carried out by the rendering processor 34 which mainly generates image data. This data preparation will specifically be discussed later.

According to this embodiment of the invention, after writing of image data including color data of RGB into the frame buffer memory 17 is completed and immediately before the image data is supplied to a display unit 19, a blur processor 18 performs a blur process on the image data to be read from the frame buffer memory 17, by using data about blur values which have been written in the blur-value buffer memory 16 pixel by pixel or in the predetermined pixel unit.

The blur processor 18 executes a predetermined blur process on the image data which is output from the frame buffer memory 17, and sends the blurred image data to the display unit 19. As the blur process is performed independently of the data writing in the frame buffer memory 17, therefore, the efficiency of image data processing can be enhanced.

With the frame frequency being 60 Hz, for example, data writing in the frame buffer memory 17, writing of blur values in the blur-value buffer memory 16 and the blur process pixel by pixel or in the predetermined pixel unit are executed every 1/60 sec. If one expects that the blur process takes time significantly, two frame buffer memories 17 and two blur buffer memories 16 would be provided so that a rendering process and a blur process are alternately performed with respect to each two memories.

Detailed Description of Image Processing

Figure 3:
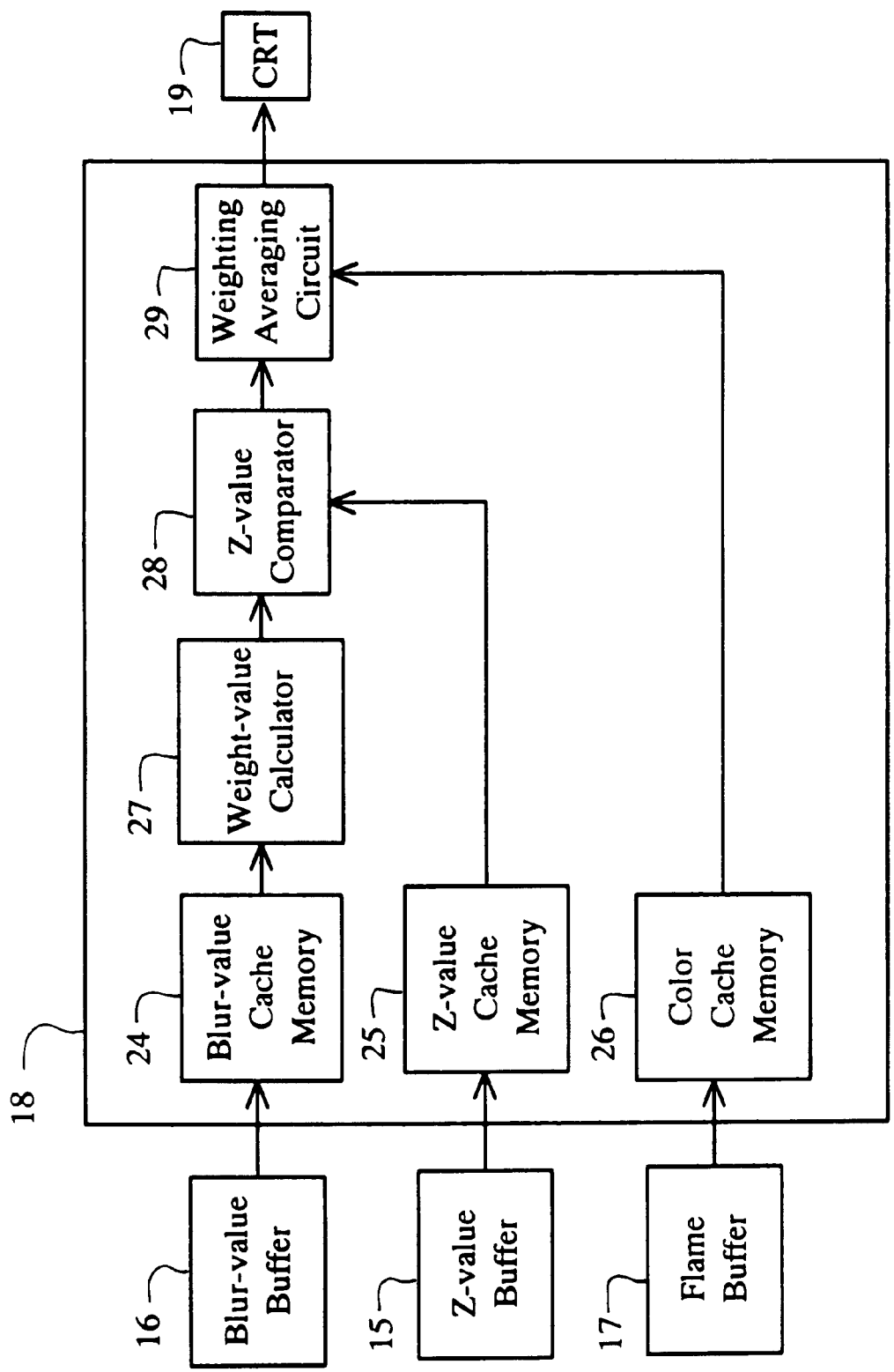
FIG. 3 is a block diagram showing the internal structure of a blur processor 18.
Figure 4:
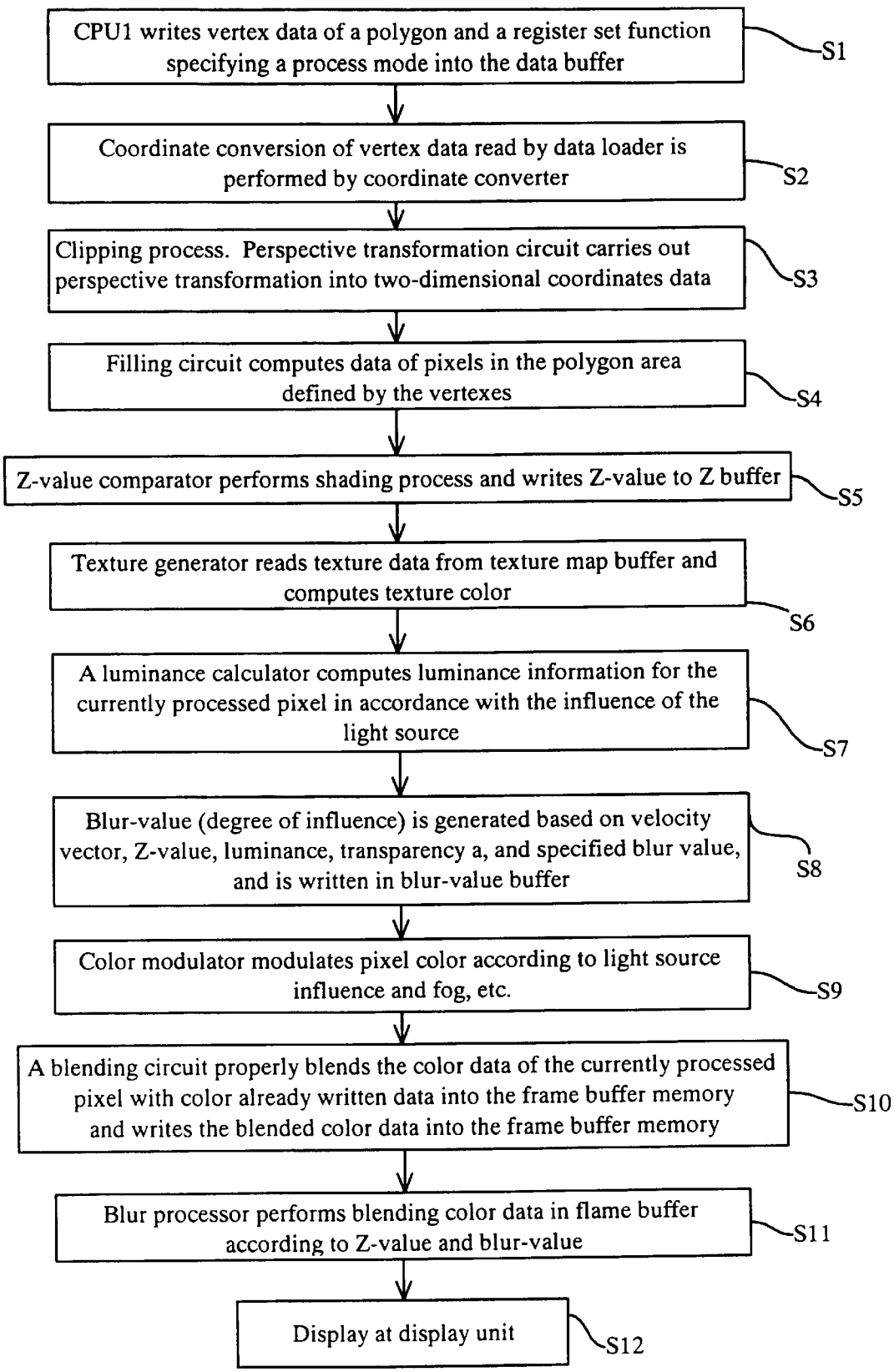
FIG. 4 is a flowchart of image processing.

FIG. 3 is a detailed block diagram showing the internal structure of the blur processor 18 in the image processing apparatus illustrated in FIG. 2, and FIG. 4 is a flowchart of the image processing of the apparatus. The image processing will be discussed below in detail.

First, the CPU 1 writes vertex data of a polygon and a register set function specifying a process mode into the data buffer 2 (step S1).

Figure 5:
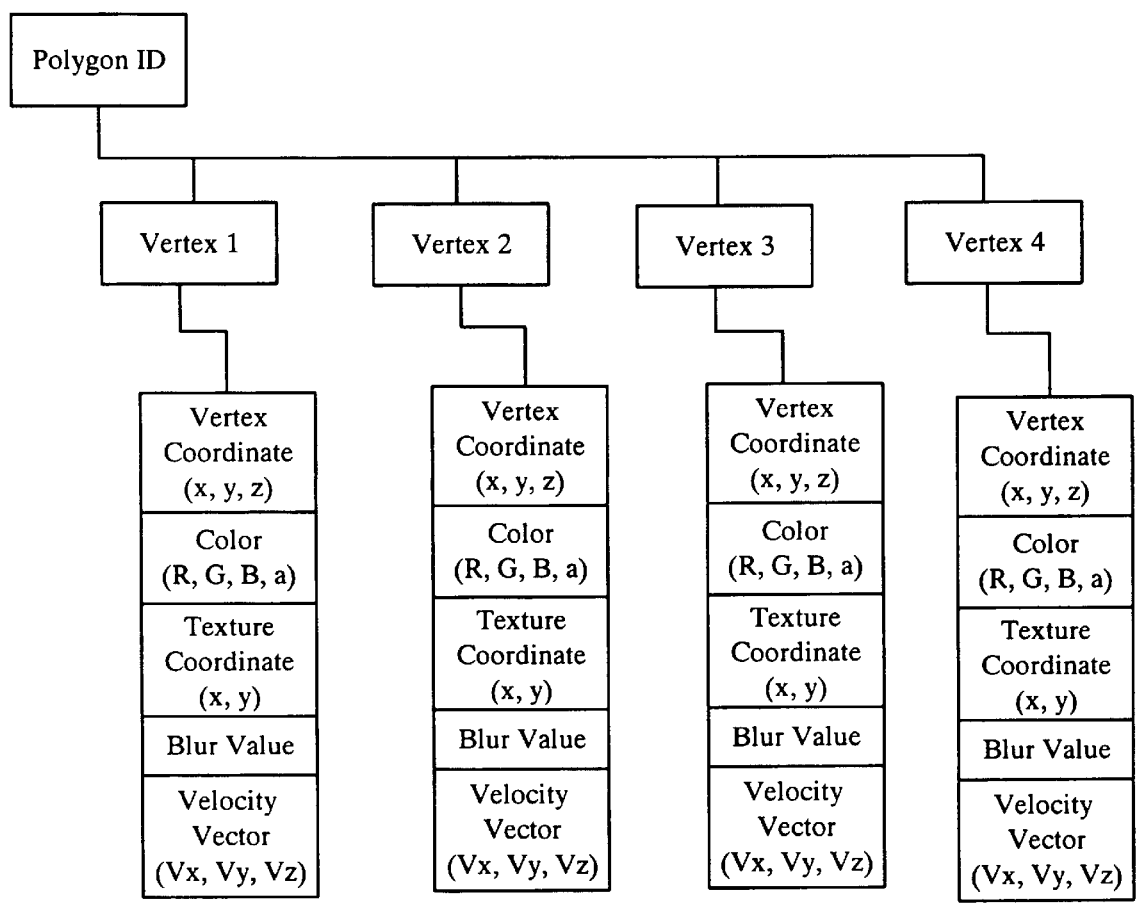
FIG. 5 is a diagram for explaining the structure of vertex data of a polygon.

FIG. 5 is a diagram for explaining the structure of the vertex data of the polygon. In the illustrated example, the polygon has four vertexes. Given to each vertex are the vertex coordinates in the coordinate system of an unillustrated polygon buffer, color data including red (R), green (G), blue (B) and transparency (a), the coordinates (address) in the texture buffer memory 14 where texture data or constituent data of the polygon is stored, and data such as a blur value specific to each polygon and a velocity vector both given by the CPU 1. In some case, a normal vector for each vertex may be given. Alternatively, whether or not a time-dependent change in the vertex coordinates exceeds a predetermined threshold value is determined through computation to determine if a blur value dependent on the speed should be given.

This embodiment is characterized by the additional velocity vector and specific blur value mentioned above in executing the blur process of the invention. If the color data and specific blur value are the same data for each polygon, they need not be provided for each vertex.

Such vertex data of the polygon and the register set function are sequentially read from the data buffer 2 by a data loader 3 and are supplied to a coordinate converter 4.

For conversion of the coordinate system in the aforementioned polygon buffer to the coordinate system in the three-dimensional space, the coordinate converter 4 performs the arrangement (conversion) of an object in the three-dimensional space with respect to vertex data in accordance with matrix information given by the CPU 1. That is, an instruction for the parallel movement, rotation or the like of a polygon is given as matrix information by the CPU 1, and the geometry processor 32 arranges an object in accordance with that instruction. Specifically, coordinate conversion of the vertex coordinates and velocity vector is performed (step S2).

The coordinate converter 4 also sets a view port in the three-dimensional space in accordance with observing point information. When the vertex data of a polygon does not have attribute data of a normal vector, this coordinate converter 4 computes the normal vector of each vertex from the inclination or the like of the polygon. This normal vector is used later, for example, in finding the reflecting direction of light.

Next, a clipping circuit 5 removes any vertex outside the view port, and generates a new vertex in the boundary of the view port, so that a polygon defined by vertexes entirely fits in the view port area. This is a normal clipping process.

Then, a perspective transformation circuit 6 carries out perspective transformation of vertex data in the view port area from the three-dimensional coordinates to the two-dimensional coordinates on the display screen. Specifically, perspective transformation of the three-dimensional coordinates of a vertex and the velocity vector is performed. A Z value which expresses the depth on the display screen is generated at the same time (step S3).

The above processes are executed in the geometry processor 32. Those processes are performed by the individual circuits under the so-called pipeline control. In other words, the individual circuits perform the respective processes polygon by polygon in synchronism with a clock in the system.

Processing in the rendering processor 34 will now be discussed. First, based on vertex data converted into the two-dimensional coordinates, a filling circuit 7 computes data of pixels in the polygon area defined by the vertexes (step S4).

Figure 6:
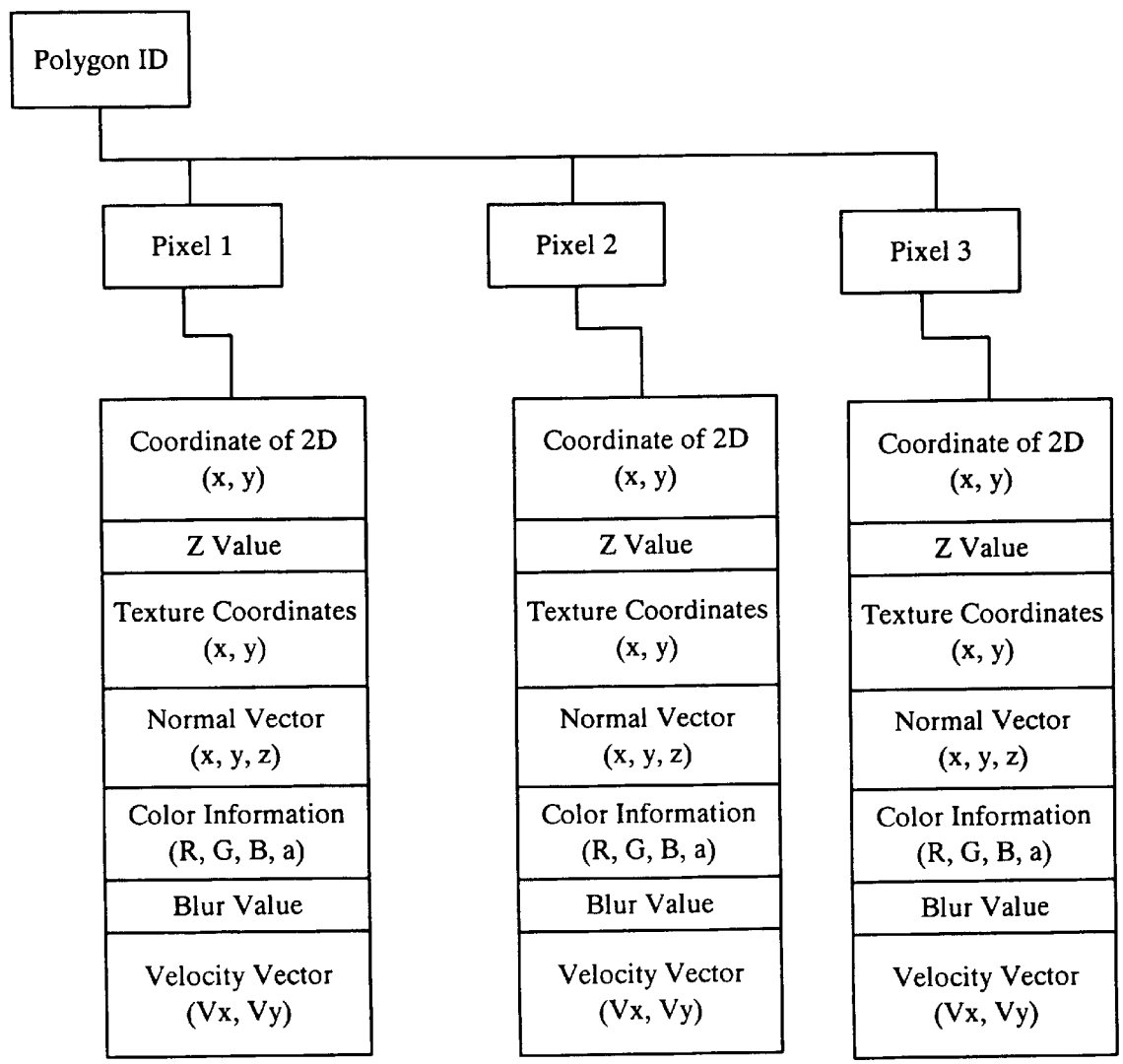
FIG. 6 is a diagram exemplifying the structure of pixel data.

FIG. 6 is a diagram exemplifying the structure of the pixel data. Suppose a polygon is comprised of pixels 1, 2 and 3. For each pixel, attribute data includes coordinates (x, y), a Z value, texture coordinates, a normal vector, color information, a specific blur value and a velocity vector. For example, the coordinates (x, y) of a pixel can be acquired by interpolation from coordinate data in the vertex data. Other attribute data can also be computed from the vertex data by interpolation.

Subsequent processes are carried out one after another, pixel by pixel, by the aforementioned pipeline control system.

A Z-value comparator 8 compares the Z value for a pixel, which is currently being processed, with a Z value, already written in an area in the Z-value buffer memory 15 which corresponds to a pixel at the same position to perform a shading process (step S5). Specifically, the Z value of the foremost pixel in the display screen is always stored in the Z-value buffer memory 15, and it is then determined whether or not the Z value for the pixel, currently being processed, is smaller than the Z value in the Z-value buffer memory 15. If the former Z value is smaller than the latter, it means that the pixel of interest is located in front. In this case, therefore, the currently processed pixel should be displayed on the display screen and corresponding image data is written in the associated area in the frame buffer memory 17. Thus, image data in the frame buffer memory 17 becomes image data (R, G, B data, etc.) of the pixel whose Z value has been written in the Z-value buffer memory 15.

A texture generator 9 reads texture data from the texture buffer memory 14 in accordance with the texture coordinates or one attribute of pixel data in FIG. 6, and computes the texture color of the corresponding pixel (step S6). This computation is carried out because data in the texture buffer 14 should not necessarily correspond to the positions of pixels in the display screen in one-to-one relation.

A luminance calculator 10 computes luminance information for the currently processed pixel in accordance with the influence of the light source (step S7). This luminance information includes, for example, diffusion light (diffused color) according to the light to be irradiated on an object, and mirror-reflected light (specular color) which is emitted by the object itself. Such luminance information is utilized in the computation of color data as final image data in a color modulator 12. Note that light source data is previously given from the CPU 1.

Next, a blur-value generator 11 computes the following values, from pixel data, as values indicating the degrees of influence of the currently processed pixel on surrounding pixels, and writes them in the blur-value buffer memory 16 pixel by pixel or in a predetermined pixel unit (step S8).

(1) The difference between a Z value and the depth of field (focus blur value)
(2) Velocity vector (blur value by motion blur)
(3) Luminance (blur value of the light source)
(4) Semitransparent blur value (blur value at the back of a semitransparent surface)
(5) Blur value specific to a polygon (specified blur value)

Figure 7:
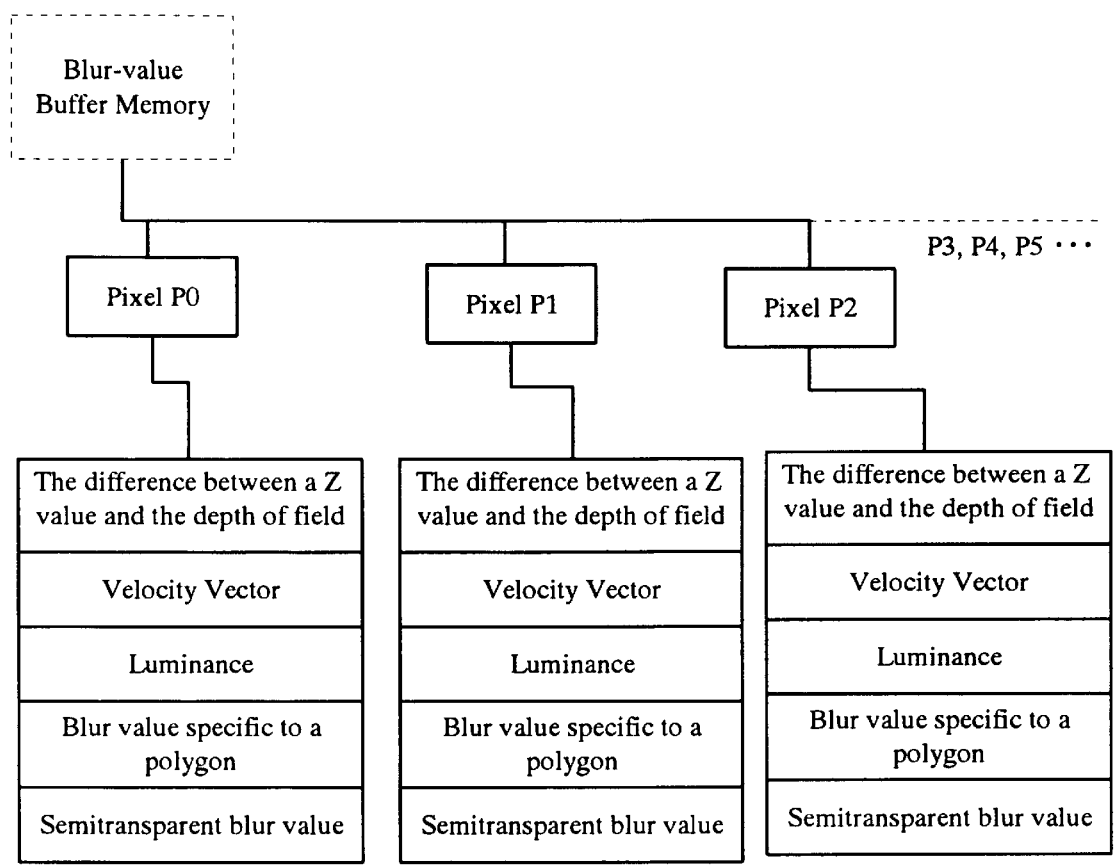
FIG. 7 is a diagram depicting the structure of data for each pixel, which is to be stored in a blur-value buffer memory 16.

FIG. 7 is a diagram showing the structure of data for each pixel, which is to be stored in the blur-value buffer memory 16. Values corresponding to the aforementioned five blurs are computed as blur values and given to each pixel. Instead of the aforementioned values indicating the degrees of influence, the blur values to be stored in the blur-value buffer memory 16 may be a weight value which is acquired from those five pieces of data to directly indicate the degrees of influence on surrounding pixels. Which stage of a blur value should be stored in the blur-value buffer memory 16 is determined by the tradeoff between the processing weight and the display speed.

The value (1) can be acquired by a computation to acquire the difference between the Z value and the depth of field. As the value (2), the velocity vector in pixel data can be used directly. With regard to the value (3), when the luminance is found to exceed a certain threshold value based on the result of the computation performed by the luminance calculator 10, that pixel is considered as some kind of light source and a value indicating the degree of luminance is given thereto. As the value (5), the blur value in pixel data can be used directly.

When the currently processed pixel is determined as a semitransparent pixel from the transparency a, one element in color data of the currently processed pixel, the distance from the semitransparent surface to a polygon at the back thereof is acquired from the difference between the Z value of the currently processed pixel and the corresponding Z value already written in the Z-value buffer memory 15, and the semitransparent blur value (4) is then acquired from the transparency a and the computed distance.

The color modulator 12 obtains color data of a pixel according to the luminance information from the texture color read from the texture buffer 14 and the diffusion light and mirror-reflected light, which have been acquired by the luminance calculator 10. For instance, a texture color is color information of an element when that element is positioned at a 100% bright location. Color modulation by the influence of the luminance is performed by the following equation.

color data=(texture color)×(diffusion light)+(mirror-reflected light)

That is, for a pixel at a bright location, the texture color is expressed directly, and reflected light from the pixel as a mirror is added to that texture color.

Further, the color modulator 12 performs modulation in view of the influence of fog or the like too. For a pixel with a large Z value in the fog, the color of the fog is blended in accordance with the degree of the Z value (step S9).

A blending circuit 13 properly blends the color data of the currently processed pixel with color already written in the frame buffer memory 17, and writes the blended color data into the frame buffer memory 17 (step S10). For example, the color data of a semitransparent pixel and the color data of a pixel at the back of the former pixel (stored in the frame buffer memory 17) are blended together in accordance with the transparency a of the former pixel. It is to be noted that since this blended color data is not subjected to a blur process, the boundary portion stays clear.

Color data (RGB) is written in the frame buffer memory 17 pixel by pixel in the above-described manner. Note again that this color data has not undergone any blur process. If this color data is supplied directly to the display unit, therefore, the resultant image becomes an unrealistic image which has not undergone a blur process.

Blur Process

Next, the blur processor 18 performs filtering for blurring by using the blur-value buffer memory 16 where blur values for the individual pixels are stored through the above-described processing and the Z-value buffer memory 15 where pixel-by-pixel color data is stored, and supplies display color data to the display unit 19. That is, the blur processor 18 carries out a blur process on color data in the frame buffer memory 17 (step S11). Then, the color data is displayed by the display unit 19 (step S12).

FIG. 3 presents a block diagram showing the internal structure of the blur processor 18. The blur processor 18 is provided with cache memories 24, 25 and 26 which temporarily store data from the respective buffer memories 15, 16 and 17. The blur processor 18 further comprises a a weight-value calculator 27, a Z-value comparator 28 and a weighting averaging circuit 29.

The weight-value calculator 27 acquires a weight value which indicates the weighting degree of influence of pixels around the currently processed pixel on the currently processed pixel as the degree of blur. In other words, the weight value indicates the degree of addition at the time color data of the surrounding pixels are added, and is the value of a sort of filter.

Figure 8:
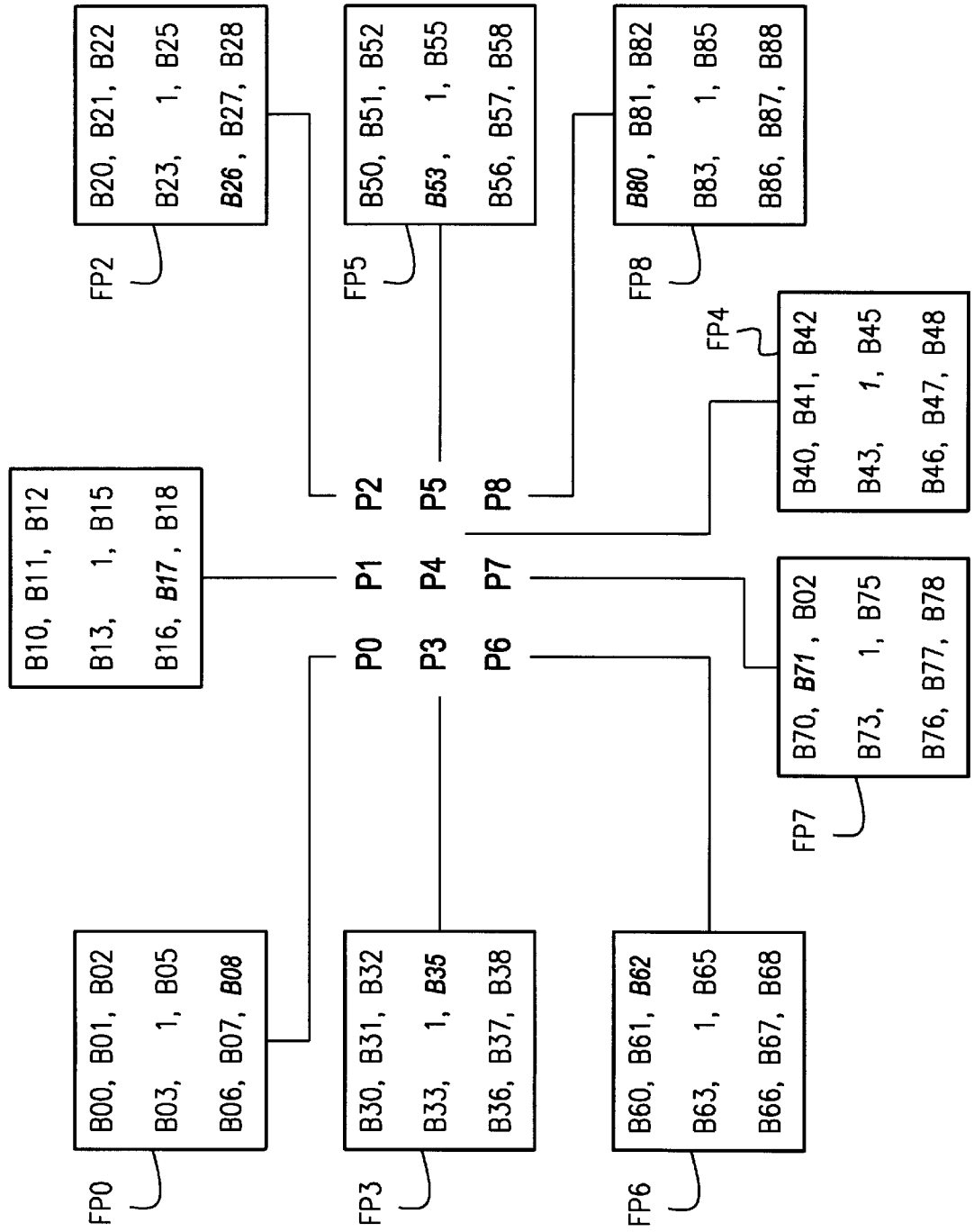
FIG. 8 is a diagram showing an example of the data structure in the blur-value buffer memory.

This filter will now be discussed referring to FIGS. 8 and 9. FIG. 8 shows weight values for nine pixels P0 to P8 arranged in a matrix form. FP0 to FP8 indicates the degrees of influence of the nine pixels on the surrounding pixels, respectively. In this example, the range of influence of one pixel on the ambient covers eight pixels around it. This range is arbitrarily set from the processing speed, the precision of blurring and the like.

In FIG. 8, the degree of blurring influence of the pixel P0 on the surrounding pixels is obtained as:

$$FP0=(B00, B01, B02, B03, B04, B05, B06, B07, B08)$$

How much blurring should be given to the surrounding pixels is calculated from the values in the blur-value buffer memory shown in FIG. 7. The accumulated degree of influence obtained from the five types of blur values is acquired in the above manner as weight values for the surrounding pixels. Therefore, B04 is the degree of influence on itself, and is normally "1." The weight-value computation is accomplished by equally giving weight values to the respective surrounding pixels, for example, in accordance with the accumulated degree of influence obtained from the five types of blur values. It is to be noted however that the weight-value computation for the velocity vector is implemented by giving a weight value according to the size of the vector to the surrounding pixels according to the directivity of the direction of that vector.

In FIG. 8, therefore, the italicized weight values (B08, B17, B26, B35, 1, B53, B62, B71, B80) in the filters FP0–FP8 for the individual pixels are acquired weight values to be given to the pixel P4 from the surrounding pixels. FIG. 9 shows that weighting filter.

Next, the Z-value comparator 28 compares the Z value of the currently processed pixel with the Z values of the surrounding pixels. This operation is performed to prevent a background pixel in the display screen from causing blurring on a foreground pixel. This idea will be discussed with reference to FIG. 11.

Figure 11:
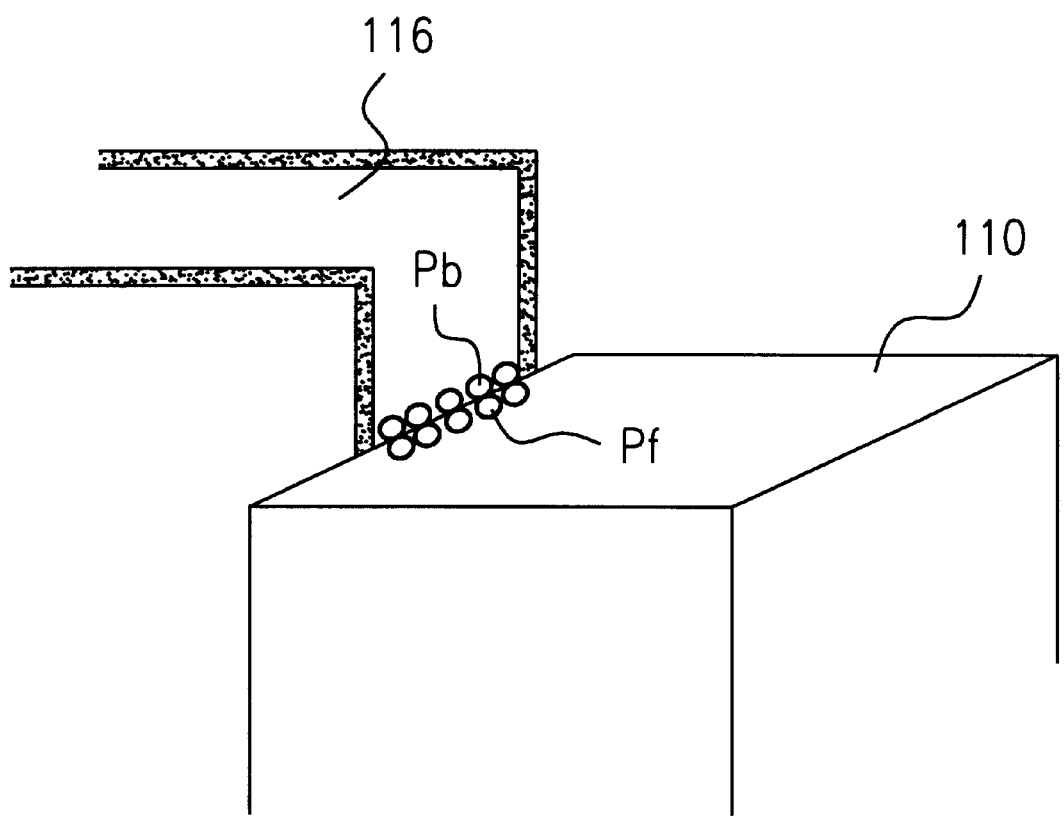
FIG. 11 is a diagram for explaining a process in a Z-value comparator.

FIG. 11 is a diagram for explaining the principle of the operation of the Z-value comparator. The following description will be given of the degree of influence of blurring of a pixel at the boundary portion between the building 110 and the distant goal 116 in the display screen in FIG. 1. A pixel Pb in the goal 116 is located at the back of a pixel Pf in the building 110. This can be determined by comparing the Z values of both pixels with each other. In this case, processing should be performed not to inflict the influence of blurring from the back pixel Pb on the front pixel Pf.

When the Z-value comparator 28 determines that the currently processed pixel is located at the back of surrounding pixels, therefore, the weight value of the back pixel to the front pixel is replaced with zero or a small value, for example. As a result, it is possible to prevent the influence of blurring from the back pixel Pb from being inflicted on the front pixel Pf.

Figure 10:
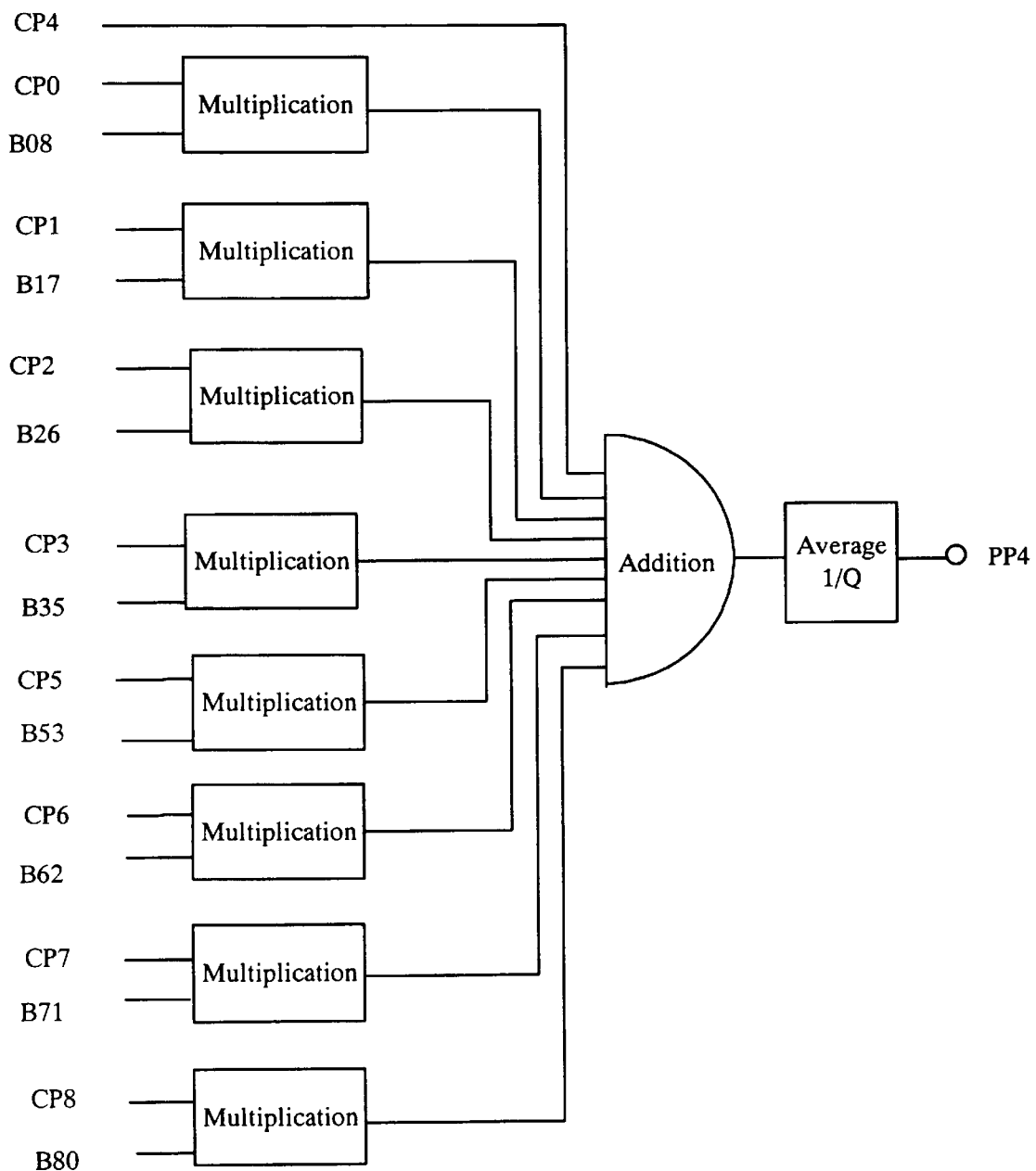
FIG. 10 is a structural diagram of one example of a weighting averaging circuit.

Finally, the weighting averaging circuit 29 performs an arithmetic operation as shown in FIG. 9 using the above-described filter having weigh values. FIG. 10 shows one example of the weighting averaging circuit 29. As apparent from this figure, color data CP0 to CP8 of the surrounding pixels are multiplied by respective weight values B08 to B80, and the resultant values are added together and its average value is then obtained.

As mentioned earlier, data of the degree of influence shown in FIG. 8 may have been generated by the blur-value generator 11 in the rendering processor 34 and stored in the blur-value buffer memory 16. The circuit design is modified as needed in accordance with the tradeoff between the processing weight and the processing speed.

The foregoing description of this embodiment has been given mainly of the blur process. But, this invention can be adapted to a case of carrying out an effect process, not just to a narrower case of executing a blur process. In this case, the blur-value generator 11 in FIG. 2 is replaced with an effect-value generator, the blur-value buffer memory 16 with an effect-value buffer memory, and the blur processor 18 with an effect processor.

One example of an effect process other than a blur process is a process for giving fluctuation to a distant image under a high-temperature environment as in a desert or savanna. Another example is a process which gives fluctuation to an image in the fire at the scene of a fire. In the case of such a fluctuation process, when flag data for applying a fluctuation process to the screen is on, the effect-value generator generates effect values, pixel by pixel, in accordance with that flag data. When effect data for applying a fluctuation process to a predetermined area on the display screen is given, effect values are generated for pixels in that area. Those effect values are stored in the effect-value buffer memory 16.

The effect processor 18 subjects image data read from the frame buffer memory 17 to a predetermined effect process in accordance with the pixel-by-pixel effect values in the effect-value buffer memory 16. In the case where a uniform fluctuation process over the display screen by the flag data which gives fluctuation is desired, for example, it is determined if the image is a distant image such that the Z values of pixels exceed a predetermined threshold value, a fluctuation process is performed on the image data of the distant pixels. The fluctuation process is a process which, for example, shifts image data of pixels to the positions of adjoining pixels so that the distant image appears fluctuating in the display screen. In the case where effect values are given to pixels in a predetermined area in the display screen, when the Z values of the pixels in that area exceed the threshold value, the aforementioned fluctuation process is carried out. It is also possible to set the level of fluctuation by generating effect values according to the level of the temperature of air.

The flag data which gives fluctuation and data of the area which is to be subjected to a fluctuation process are supplied to the rendering processor 34 from the CPU 1.

As described above, as apparent from the above, the provision of the effect processor, which performs a predetermined effect process on image data, temporarily generated and stored in the frame buffer memory 17, at the stage of outputting the image data to the display unit, can allow image data undergone an effect process to be supplied to the display unit while executing the effect process in real time.

As described above, this invention can generate image data given effective blurring by executing a blur process on image data in the frame buffer memory. This invention can thus generate and display image data, subjected to a blur process, without involving the conventional troublesome process of overlapping image data of plural sheets of pictures one on another.

Further, as the effect processor for performing a fluctuation process or the like can be provided between the frame buffer memory and the display unit according to this invention, an effect process can be given to image data independently of data writing in the frame buffer memory so that image data given a predetermined effect can be supplied to the display unit.

What is claimed is:

1. An image processing apparatus for generating image data to be displayed on a predetermined display screen, comprising:

an image data generator for receiving polygon information of a polygon including at least position information on said display screen and generating image data corresponding to pixels in said polygon;

a frame buffer memory for storing the image data pixel by pixel;

a blur-value buffer memory for storing information of a degree of influence of said image data of each pixel on pixels therearound, as a blur value, in a predetermined pixel unit; and a blur processor for performing an arithmetic operation on said image data of each pixel, read from said frame buffer memory, in accordance with said degree of influence from surrounding pixels, read from said blur-value buffer memory, to generate image data to be displayed on said display screen.

2. The image processing apparatus according to claim 1, wherein said blur processor is provided between said frame buffer memory and an output terminal to a display unit, and outputs said image data, generated through said arithmetic operation, from said output terminal to said display unit.

3. The image processing apparatus according to claim 1 or 2, wherein said position information included in said polygon information includes a Z value indicative of the depth of a polygon on said display screen, and said image data generator generates Z values for pixels in a polygon to be displayed on said display screen, pixel by pixel;

said image processing apparatus further comprises a Z-value buffer memory for storing said pixel-by-pixel Z values; and said blur processor compares the Z value of a target pixel with those of surrounding pixels around said target pixel, and performing said arithmetic operation in accordance with the degree of influence from said surrounding pixels when said target pixel is located at the back.

4. The image processing apparatus according to claim 1 or 2, wherein said position information included in said polygon information includes a Z value indicating of the depth of a polygon on said display screen, and said image data generator generates Z values for pixels in a polygon to be displayed on said display screen, pixel by pixel;

said image processing apparatus further comprises a Z-value buffer memory for storing said pixel-by-pixel Z values; and the degree of influence of each pixel on pixels therearound is determined in accordance with a difference between the Z value of said each pixel and a depth of field to be displayed on said display screen.

5. The image processing apparatus according to claim 1 or 2, wherein said image data generator generates a velocity vector of each pixel; and the degree of influence of said each pixel on pixels therearound is determined in accordance with said velocity vector of that pixel.

6. The image processing apparatus according to claim 1 or 2, wherein said polygon information includes luminance information or information for determining a luminance, and said image data generator generates luminance information of each pixel; and when said luminance information of each pixel exceeds a predetermined value, the degree of influence of that pixel on pixels therearound is determined in accordance with said luminance information.

7. The image processing apparatus according to claim 1 or 2, wherein said polygon information includes transparency information of a polygon or information for determining a transparency of that polygon, and said image data generator generates image data of a semitransparent polygon overlapped with a polygon located at the back of said semitransparent polygon; and the degree of influence of pixels in said back polygon on surrounding pixels is determined in accordance with said transparency information.

8. An image processing method for generating image data to be displayed on a predetermined display screen, comprising;

a step of generating image data for each of pixels in a polygon based on polygon information of said polygon including at least position information on a display screen;

a step of storing said image data in a frame buffer memory pixel by pixel;

a step of storing information of a degree of influence of said image data of each pixel on pixels therearound in a blur-value buffer memory, as a blur value, in a predetermined pixel unit; and a blur processing step of performing an arithmetic operation on said image data of each pixel, read from said frame buffer memory, in accordance with said degree of influence from surrounding pixels, read from said blur-value buffer memory, to generate image data to be displayed on said display screen.

9. The image processing method according to claim 8, wherein said position information included in said polygon information includes a Z value for indicating the depth of a polygon on said display screen, and said image data generator generates Z values for pixels in a polygon to be displayed on said display screen, pixel by pixel;

said image processing method further comprises a step of generating Z values for pixels in a polygon to be displayed on said display screen, pixel by pixel, and storing said pixel-by-pixel Z values in a Z-value buffer memory; and said blur processing step compares the Z value of a target pixel with those of surrounding pixels around said target pixel, and performing said arithmetic operation in accordance with the degree of influence from said surrounding pixels when said target pixel is located at the back.

10. The image processing method according to claim 8, wherein said position information included in said polygon information includes a Z value for indicating a depth of a polygon on said display screen;

said image processing method further comprises a step of generating Z values for pixels in a polygon to be displayed on said display screen, pixel by pixel, and storing said pixel-by-pixel Z values in a Z-value buffer memory; and the degree of influence of each pixel on pixels therearound is determined in accordance with a difference between the Z value of said each pixel and a depth of field to be displayed on said display screen.

11. The image processing method according to claim 8, further comprising a step of generating a velocity vector of each pixel, and determining the degree of influence of said each pixel on pixels therearound in accordance with said velocity vector of that pixel.

12. The image processing method according to claim 8, wherein said polygon information includes luminance information or information for determining a luminance; and said image processing method further comprises a step of generating luminance information of each pixel, and determining the degree of influence of that pixel on pixels therearound in accordance with said luminance information of that pixel when said luminance information exceeds a predetermined value.

13. The image processing method according to claim 8, wherein said polygon information includes transparency information of a polygon or information for determining a transparency of that polygon; and said image processing method further comprises a step of generating image data of a semitransparent polygon overlapped with a polygon located at the back of said semitransparent polygon, and determining the degree of influence of pixels in said back polygon on surrounding pixels in accordance with said transparency information.

14. An image processing apparatus for generating image data to be displayed on a predetermined display screen, comprising:

an image data generator for receiving polygon information of a polygon including at least position information on said display screen, generating Z values for pixels in said polygon, pixel by pixel, based on a Z value for indicating of a depth of said polygon on said display screen, and generating image data corresponding to said pixels in said polygon; a Z-value buffer memory for storing said pixel-by-pixel Z values;

a frame buffer memory for storing image data pixel by pixel;

a blur-value buffer memory for storing information of a degree of influence of said image data of each pixel on pixels therearound, as a blur value, in a predetermined pixel unit; and a blur processor for performing an arithmetic operation on said image data of each pixel, read from said frame buffer memory, in accordance with said degree of influence from surrounding pixels, read from said blur-value buffer memory, to generate image data to be displayed on said display screen, wherein said blur processor compares the Z value of a target pixel with those of surrounding pixels around said target pixel, and performing the arithmetic operation in accordance with the degree of influence from said surrounding pixels when said target pixel is located at the back.

15. An image processing apparatus for generating image data to be displayed on a predetermined display screen, comprising:

a rendering processor for receiving polygon data having at least coordinates of vertexes, Z values of said vertexes and texture coordinates on said display screen, storing a Z value of a polygon, positioned foreground in said display screen, in a Z-value buffer memory, and generating image data including color data corresponding to pixels in said polygon from said texture data read from a texture buffer memory in accordance with said texture coordinates;

a frame buffer memory for storing image data pixel by pixel;

a blur-value buffer memory for storing information of a degree of influence of said image data of each pixel on pixels therearound, as a blur value, in a predetermined pixel unit; and a blur processor for performing an arithmetic operation on said image data of each pixel, read from said frame buffer memory, in accordance with said degree of influence from surrounding pixels, read from said blur-value buffer memory, to generate image data to be displayed on said display screen, wherein said blur processor compares the Z value of a target pixel with those of surrounding pixels around said target pixel, and performing the arithmetic operation in accordance with the degree of influence from said surrounding pixels when said target pixel is located at the back.

16. An image processing apparatus for generating image data to be displayed on a predetermined display screen, comprising:

an image data generator for receiving polygon information of a polygon including at least position information on said display screen and generating image data corresponding to pixels in said polygon;

a frame buffer memory for storing image data corresponding to said pixels;

an effect-value buffer memory for storing effect values indicating execution of a predetermined effect process on image data of individual pixels, pixel by pixel; and an effect processor for performing said effect process on said image data of each pixel, read from said frame buffer memory, in accordance with an effect value read from said effect-value buffer memory, to generate image data to be displayed on said display screen, and supplying said image data to a display unit.

17. The image processing apparatus according to claim 16, wherein said predetermined effect process is a fluctuation process with respect to a distant view;

said position information included in said polygon information includes a Z value indicative of the depth of a polygon on said display screen, and said image data generator generates Z values for pixels in a polygon to be displayed on said display screen, pixel by pixel;

said image processing apparatus further comprises a Z-value buffer memory for storing said pixel-by-pixel Z values; and said effect processor executes said fluctuation process in accordance with said effect value when the Z value of a target pixel exceeds a predetermined threshold value.

18. An image processing method for generating image data to be displayed on a predetermined display screen, comprising:

a step of generating image data for each of pixels in a polygon based on polygon information of said polygon including at least position information on said display screen;

a step of storing image data, pixel by pixel, in a frame buffer memory;

a step of storing effect values indicating execution of a predetermined effect process on image data of individual pixels, pixel by pixel, in an effect-value buffer memory; and an effect processing step of performing said effect process on said image data of each pixel, read from said frame buffer memory, in accordance with an effect value read from said effect-value buffer memory, to generate image data to be displayed on said display screen, and supplying said image data to a display unit.

* * * * *